United States Patent [19]

Bartur

[11] 4,425,743

[45] Jan. 17, 1984

[54] INGROUND FLUID STORAGE TANK AND METHOD OF ERECTION THEREOF

[76] Inventor: Joseph Bartur, 18 Daphna St., Tel-Aviv, Israel

[21] Appl. No.: 207,745

[22] Filed: Nov. 17, 1980

[51] Int. Cl.³ .......................................... B65D 88/76
[52] U.S. Cl. ................................ 52/169.5; 52/169.1; 220/1 B; 405/53
[58] Field of Search ................ 52/169.1, 169.3, 169.4, 52/169.5, 169.14; 220/1 B; 405/53, 57

[56] References Cited

U.S. PATENT DOCUMENTS

| | | | |
|---|---|---|---|
| 1,320,256 | 10/1919 | McLeod | 52/169.5 |
| 2,333,315 | 11/1943 | Klingberg | 220/1 B |
| 2,410,338 | 10/1946 | Craine | 52/169.9 |
| 2,531,742 | 11/1950 | Pomykaza | 220/1 B |
| 3,557,558 | 1/1971 | Eakin | 405/57 |

FOREIGN PATENT DOCUMENTS

| | | | |
|---|---|---|---|
| 1538626 | 7/1968 | France | 405/53 |
| 387401 | 6/1965 | Switzerland | 405/53 |

*Primary Examiner*—John E. Murtagh
*Assistant Examiner*—Richard E. Chilcot, Jr.
*Attorney, Agent, or Firm*—Brady, O'Boyle & Gates

[57] ABSTRACT

An inground storage tank, particularly for storage of oil and inflammable liquids comprises a concrete wall enclosing a steel shell and surrounded by a water pervious sheet of plastics material and a mantle of gabions. The gabions allow water drainage to drainage ducts in the foundations of the wall. The steel shell has a conical roof structure welded thereto and a layer of earth on the roof. Columns within the shell support the roof. The tank is constructed by constructing the foundations and drainage ducts and then building a portion of wall, and shell, filling the shell with water, surrounding the wall with plastics sheet and gabions and repeating these steps until the required height is reached. The roof is then secured to the shell.

13 Claims, 2 Drawing Figures

INGROUND FLUID STORAGE TANK AND METHOD OF ERECTION THEREOF

The present invention relates to inground fluid storage tanks and to a method for the erection of such a tank. In particular, the invention is applicable to storage tanks for oil or other inflammable liquids.

Generally heretofore, such tanks have been built of concrete with an interior shell constructed of thin steel sheets, i.e. similar to above-ground tanks but with concrete walls around them. Such tanks are costly to build and because of problems associated with drainage around the tanks after a period of time it is usual for water to penetrate the concrete wall and to cause corrosion of the steel shell, so that replacement or costly repair becomes necessary.

It is also known to provide concrete tanks lined with an epoxy layer. However, inevitably after a time cracks occur in the concrete and leakage of the fluid from within the tank through such cracks then takes place.

It is an object of the present invention to provide an inground fluid storage tank which avoids or at least substantially alleviates the aforementioned disadvantages associated with known tanks. It is also an object of the invention to provide a convenient method for the construction of such a tank.

The invention provides an inground fluid storage tank comprising a wall structure mounted on a foundation and enclosing a metal shell comprising shell walls and a roof secured thereto, drainage ducts in said foundation connected to soil water disposal means, a plurality of gabions surrounding said wall structure and through which water may pass, said gabions being in fluid flow connection with said soil water disposal means, and a sheet of water impervious material disposed between said gabions and said wall structure.

Preferably the drainage ducts comprise radial ducts connected to a peripheral duct and said soil water disposal means comprises a drainage shaft.

Preferably said metal shell comprises a plurality of steel sheets which are welded together, and said wall structure may be of concrete and may comprise a plurality of horizontal rims integral with the walls of said wall structure.

The roof of said metal shell may be of conical form and be welded to said shell walls. Preferably said roof is supported by beams inclined upwardly and inwardly from said shell walls and may also be supported by one or a plurality of columns disposed within said metal shell. Said column or columns are preferably substantially vertical. The roof may also comprise a central section formed of prefabricated concrete segments.

Preferably said water impervious sheet is of polyethylene.

The tank may be covered by a layer of earth.

The invention also provides a method of forming an inground fluid storage tank comprising forming a foundation having drainage ducts therein, connecting said drainage ducts to soil water disposal means, constructing on said foundation a first portion of a wall structure and a first portion of metal shell within said portion of wall structure, subsequently constructing other portions of metal shell until said metal shell is of a predetermined height, whilst after the construction of each portion of metal shell filling said shell with water, providing a plurality of gabions through which water may pass to surround and be spaced from said portion of metal shell and to be in fluid flow connection with said drainage ducts, constructing a corresponding portion of wall structure in said space, and providing a sheet of water impervious material between said gabions and said portion of wall structure and securing a roof to the last constructed portion of said metal shell.

The construction of the tank is generally as follows.

The bottom is constructed of steel on an asphalt bed and the wall structure is made of concrete according to locally existing standards.

Trenches are radially spaced in the foundation and connected to the peripheral trench, so that any leakage in the bottom of the tank will be detected in the drainage shaft, built near the tank.

The metal shell on the inside of the wall structure is erected in the same manner as a standard steel shell of an above-ground tank, but the thickness of the welded plates is the minimum thickness based on the erection requirements, as hereinafter described.

Around the steel shell, and wall structure, a mantle of gabions filled with stones is gradually, step by step, erected.

The whole internal side of the gabions is covered by polyethylene sheets. The space between the gabions and the steel shell is filled by the concrete wall structure.

Above every ring of gabions, a concrete rim is cast.

Every ring of gabions is connected separately to the drainage shaft.

The outer, conical part of the roof is connected to and is supported by the shell wall.

The central part of the roof is supported by columns.

The concrete of the conical part of the roof is cast on a steel ring, welded to the shell.

The central part of the roof is made of prefabricated concrete elements, and a layer of concrete may be superimposed thereon.

The invention will now be described further, by way of example only, with reference to the accompanying drawings in which.

Figure 1:
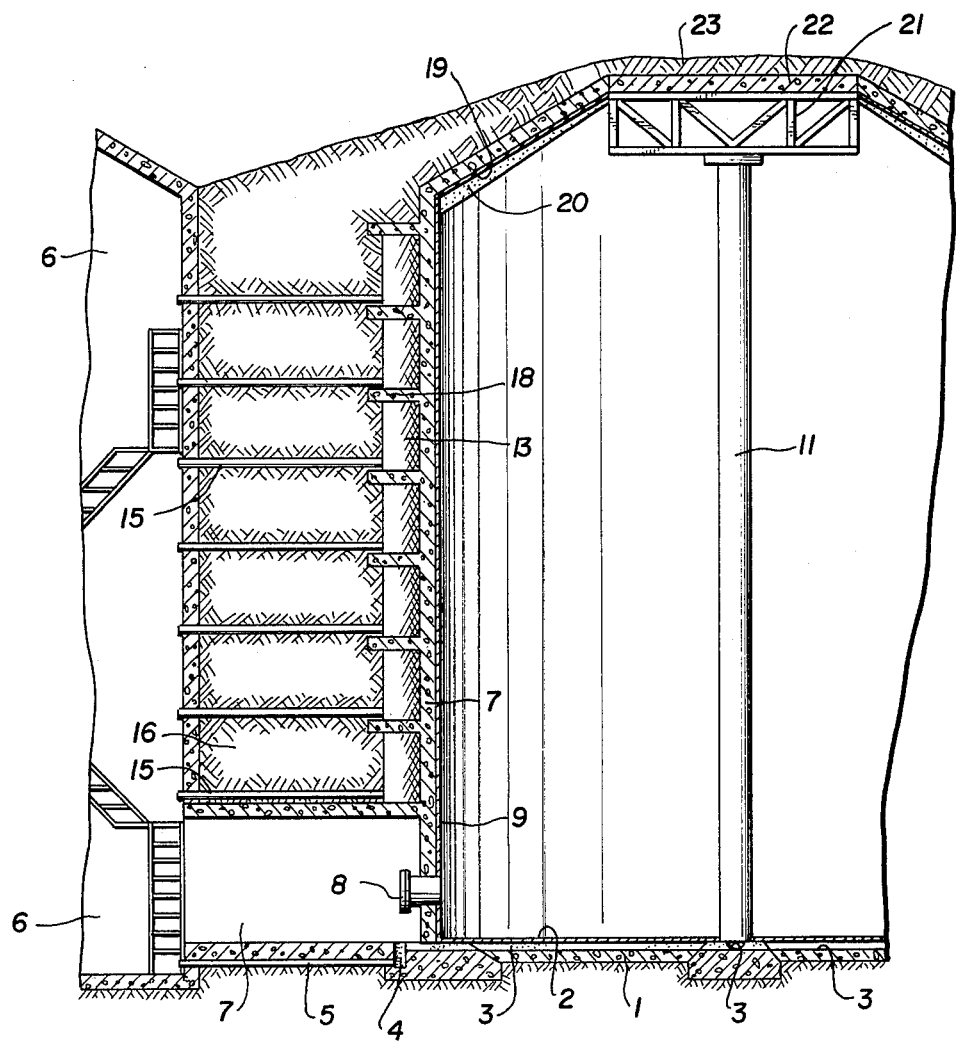
FIG. 1 is a sectional view of the tank structure.
Figure 2:
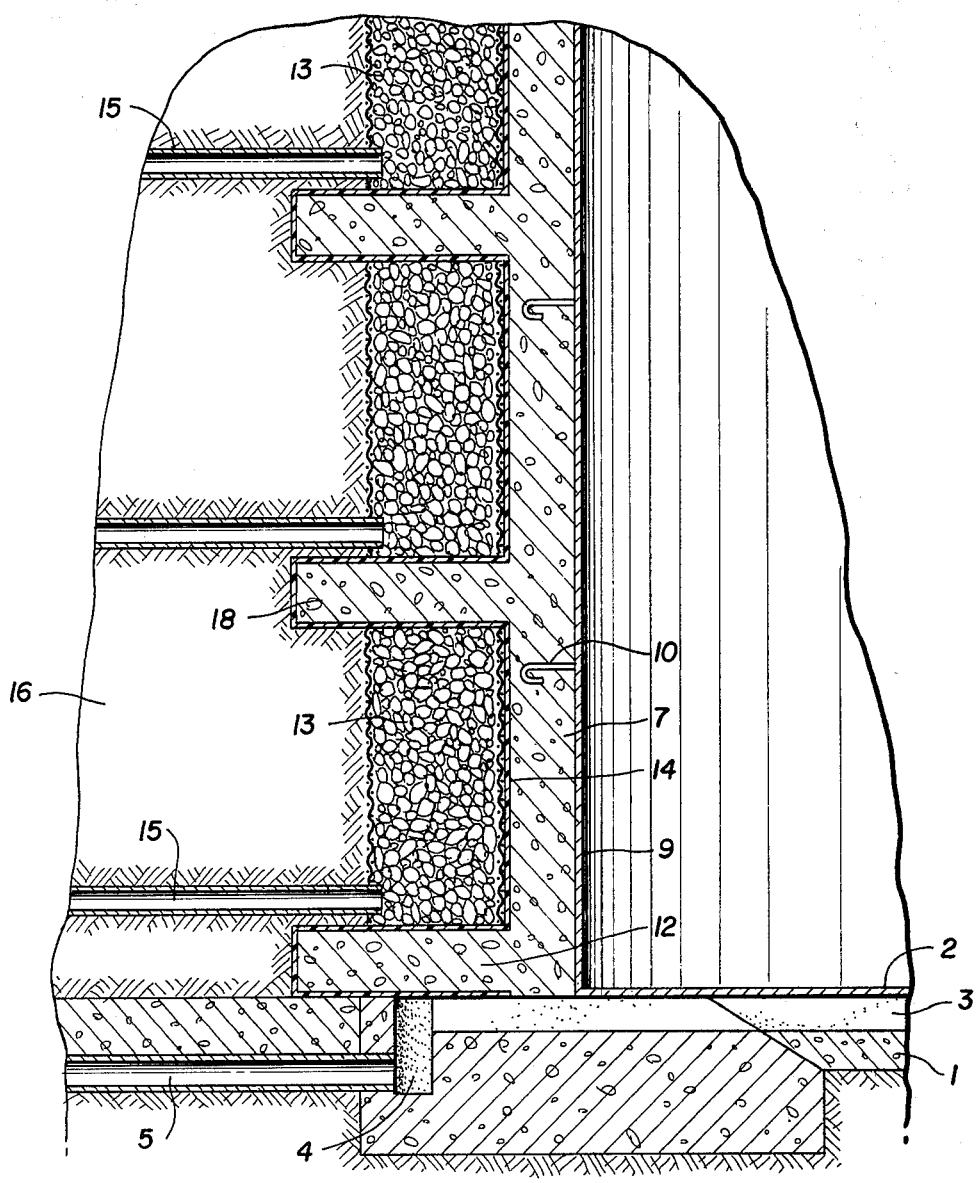
FIG. 2 illustrates the constructional details of the wall.

After the excavation of the site and the casting of the foundation, the bottom surface is planed and a layer of asphalt concrete (1) is formed thereon. A steel bottom (2) of the shell is built on the asphalt concrete layer (1).

In the foundation of the wall, under the steel bottom, there are provided radial drainage trenches (3), leading to a peripheral trench (4). The peripheral trench is connected by a steel pipe (5) to a drainage shaft (6). A tunnel (7) is constructed from the drainage shaft to the manhole (8) in the wall.

After erecting 7.5 meters of the steel shell (9) and welding the steel pieces (10) for reinforcement and construction of columns (11), the tank is filled with water to a height of 6 meters.

The first concrete rim (12) is cast.

The first gabion ring (13) is built on the concrete rim after laying a polyethylene sheet (14) on the inner side of the gabions construction.

The next step is to lower down a drainage pipe (15) between the gabions ring and the shaft, and to fill the excavation with earth (16) to the height of the gabions ring.

Now, a concrete wall (17) is cast between the gabions and the steel shell and also the next rim (18).

After the concrete has been strengthened, the tank is filled to a height of 7 meters with water, and the cycle of constructing the gabions, earth filling and concrete casting is repeated.

In this way the vertical complex wall is completed.

A conical steel shell (19) is constructed on sloped beams (20), welded to the vertical steel shell.

Meanwhile, the structure (21) supporting the flat central roof is elevated on columns, and prefabricated concrete segments (22) are placed on the structure, and the roof is completed by casting in situ. On the roof, a layer of earth (23) is placed.

In the tank of the present invention, the thickness of the steel sheets from which the metal shell is constructed may be the minimum allowed by virtue of locally prevailing regulations, for example BSS 2654 or Standard No. 650 of the American Petroleum Institute. The thickness of the concrete wall structure is determined by calculations taking into account the height and diameter of the completed tank, the thickness of the steel shell, the support from the soil surrounding the tank, including the manner of filling in the excavated site, and the support due to the hydrostatic pressure within the shell. The thickness of the roof is determined having regard to the thickness of the layer of soil to be placed thereon, whilst the conical shape of the roof allows for adequate support for such soil layer whilst keeping the thickness of the roof to a minimum.

The use of gabions surrounding the wall structure of the tank provides support for the wall structure, the easy and therefore non-costly casting of the concrete of the wall structure and the efficient drainage of the area surrounding the wall structure. The water impervious layer is preferably polyethylene since such material possesses a high degree of water resistance, has good mechanical properties such as abrasion resistance, tensile strength and resistance to tearing (shear strength) and is a readily available material. However, other water impervious materials may be used.

I claim:

1. An inground tank comprising a drainage shaft, a foundation having radial and peripheral trenches connected to said drainage shaft, an inner steel shell, an outer mantle of gabions and a concrete wall having horizontal rims cast between the steel shell and the gabions, each ring of gabions being connected separately to the drainage shaft, a polyethylene sheet, said gabions having an inner surface covered before casting the concrete by said polyethylene sheet, a plurality of sloped beams, a conical steel shell constructed on said sloped beams and welded to said steel shell, a roof having a central portion, central columns supporting said central portion which comprises prefabricated concrete segments, the complete tank being covered by a layer of earth.

2. An inground fluid storage tank comprising a foundation, a metal shell, a wall structure mounted on said foundation and enclosing said metal shell, said metal shell comprising shell walls and a roof secured thereto, soil water disposal means, drainage ducts in said foundation connected to said soil water disposal means, a plurality of generally annular rings of gabions surrounding said wall structure and through which water may pass, said rings of gabions being separated from each other by intermediate outwardly projecting rims of said wall structure, said rims having a predetermined thickness and extending outwardly beyond the outer surface of said rings of gabions, said rings of gabions being in fluid flow connection with said soil water disposal means, and a sheet of water impervious material disposed between said rings of gabions and said wall structure including said rims.

3. A tank according to claim 1, wherein said drainage ducts comprise a plurality of ducts extending radially of said tank and connected to a duct extending around the periphery thereof.

4. A tank according to claim 1 wherein said metal shell comprises a plurality of steel plates welded together.

5. A tank according to claim 1 wherein said water impervious sheet is of polyethylene.

6. A tank according to claim 1 wherein said wall structure is of concrete.

7. A tank according to claim 6, wherein said wall structure comprises generally vertical walls and wherein said outwardly projecting rims comprise a plurality of generally horizontal rims formed integrally with said walls.

8. A tank according to claim 1 wherein said roof is, at least in part, of conical form.

9. A tank according to claim 8 wherein said roof is, at least in part, of steel and is welded to said shell walls.

10. A tank according to claim 8 wherein said roof comprises a central section formed or preformed concrete segments.

11. A tank according to claim 8 comprising beams extending upwardly and inwardly from said shell walls, and on which beams said roof is supported.

12. A tank according to claim 11 comprising at least one column disposed within said metal shell, and on which said roof is further supported.

13. A tank according to claim 12, wherein said column or columns is substantially vertical.

* * * * *

UNITED STATES PATENT AND TRADEMARK OFFICE
CERTIFICATE OF CORRECTION

PATENT NO. : 4,425,743

DATED : January 17, 1984

INVENTOR(S) : Joseph Bartur

It is certified that error appears in the above-identified patent and that said Letters Patent are hereby corrected as shown below:

Column 4, Claims 3, 4, 5, 6 and 8 are corrected to read as follows - "A tank according to claim 2, ...."

Signed and Sealed this

Twelfth Day of June 1984

[SEAL]

Attest:

GERALD J. MOSSINGHOFF

Attesting Officer

Commissioner of Patents and Trademarks